(12) United States Patent
Tice

(10) Patent No.: US 7,775,042 B1
(45) Date of Patent: Aug. 17, 2010

(54) METHOD OF TRANSFORMING THERMAL ENERGY

(76) Inventor: Neil Tice, 1236 NW. Weybridge Way, Beaverton, OR (US) 97006

( * ) Notice: Subject to any disclaimer, the term of this patent is extended or adjusted under 35 U.S.C. 154(b) by 651 days.

(21) Appl. No.: 11/582,009

(22) Filed: Oct. 17, 2006

(51) Int. Cl.
F01B 29/10 (2006.01)
F02G 1/04 (2006.01)

(52) U.S. Cl. .............................. 60/529; 60/527; 60/516

(58) Field of Classification Search .................. 60/527, 60/529
See application file for complete search history.

(56) References Cited

U.S. PATENT DOCUMENTS

| 3,173,244 | A | * | 3/1965 | Schutmaat | 60/527 |
|---|---|---|---|---|---|
| 3,754,151 | A | * | 8/1973 | Clark | 290/1 R |
| 3,989,417 | A | | 11/1976 | Neidigh | 417/379 |
| 4,006,594 | A | | 2/1977 | Horton | 60/641 |
| 4,075,847 | A | | 2/1978 | Ray | 60/527 |
| 4,086,769 | A | * | 5/1978 | Smith | 60/527 |
| 4,307,541 | A | * | 12/1981 | Farmer et al. | 49/280 |
| 4,307,571 | A | | 12/1981 | Jackson | 60/641.15 |
| 4,325,217 | A | * | 4/1982 | Golestaneh | 60/527 |
| 4,598,550 | A | | 7/1986 | Abbott | 60/641.8 |
| 6,647,725 | B1 | | 11/2003 | Letovsky | 60/641.6 |
| 6,786,045 | B2 | | 9/2004 | Letovsky | 60/641.8 |
| 6,796,124 | B2 | | 9/2004 | Kutlucinar | 60/528 |
| 6,804,224 | B1 | | 10/2004 | Schuster et al. | 370/352 |
| 6,872,433 | B2 | * | 3/2005 | Seward et al. | 428/36.9 |
| 7,093,458 | B2 | | 8/2006 | Hu | 62/435 |
| 2001/0017335 | A1 | | 8/2001 | Kutlucinar | 244/102 |
| 2002/0046565 | A1 | | 4/2002 | Singh | 60/527 |
| 2002/0187020 | A1 | | 12/2002 | Julien | 411/544 |
| 2003/0226359 | A1 | | 12/2003 | Letovsky | 60/641.8 |
| 2005/0205125 | A1 | | 9/2005 | Nersessian et al. | |

* cited by examiner

Primary Examiner—Thomas E Denion
Assistant Examiner—Christopher Jetton
(74) Attorney, Agent, or Firm—Timothy E. Siegel Patent Law, PLLC

(57) ABSTRACT

A method of generating motion from a cool region that is proximal to a warm region, the cool region and the warm region defining a temperature range. The method uses an article of phase change material having a warm-to-cold phase transition and a cold-to-warm phase transition, both within the temperature range. This article is exposed to the cool region, thereby causing the phase change material to change size. When the warm-to-cold phase transition is substantially complete, this is detected. In response to this detection the article is exposed to the warm region, thereby causing the phase change material to change size. When this transition is substantially complete, the cycle is restarted with exposure to the cool region.

6 Claims, 6 Drawing Sheets

METHOD OF TRANSFORMING THERMAL ENERGY

BACKGROUND OF THE INVENTION

Many ideas for improvements in the world's energy usage focus on increasing the efficiency of existing types of engines. Most heat engines are limited in their efficiency by the theoretical efficiency of the Carnot cycle, which requires an increase in operating temperature in order to increase operating efficiency. Rather than the focus on efficiency, it may be desirable to harvest energy at a reasonable efficiency from relatively slight differences in temperature between two volumes. Currently, electric energy is typically produced by boiling water and using the steam generated to drive a turbine. This works very well if one creates a first volume with a temperature above the boiling point of water and a second volume with a temperature below the boiling point of water.

If, however, one wishes to harvest a temperature difference between two volumes, both of which are at a temperature below the boiling point of water, this method is unavailable. Although there are liquids, other than water that have different boiling points, there is far from a complete and convenient mapping of temperature differences to liquid boiling points. Accordingly, additional methods of harvesting energy from temperature differentials are desirable.

Additionally, although thermal engines employing a solid phase change material, such as Nitinol, have been designed, these engines tend to be rather inefficient and do not take advantage of the full phase change expansion that Nitinol undergoes. Many of the existing designs do not fully insulate the heat source from the heat sink and therefore do not efficiently use the available heat. Accordingly, there is a need for a more efficient engine that utilizes a phase change material.

SUMMARY OF THE INVENTION

The foregoing and other objectives, features and advantages of the invention will be more readily understood upon consideration of the following detailed description of the preferred embodiment(s), taken in conjunction with the accompanying drawings.

In a first separate aspect, the present invention may take the form of a method of generating motion from a cool region that is proximal to a warm region, the cool region and the warm region defining a temperature range. The method uses an article of phase change material having a warm-to-cold phase transition and a cold-to-warm phase transition, both within the temperature range. This article is exposed to the cool region, thereby causing the phase change material to change size. When the warm-to-cold phase transition is substantially complete, this is detected. In response to this detection the article is exposed to the warm region, thereby causing the phase change material to change size. When this transition is substantially complete, the cycle is restarted with exposure to the cool region.

In a second separate aspect, the present invention may take the form of an engine for generating motion from a cool region that is proximal to a warm region, the cool region and the warm region defining a temperature range. The engine includes an article of phase change material having a phase transition within the temperature range, and an assembly of elements, and a slider of thermal insulating material, adapted to be positioned so as to expose the article of phase change material to the cool region while insulating the article from the warm region, and alternately positioned to expose the article to the warm region, while insulating the article from the cool region. A slider movement assembly is adapted to move the slider to expose the article to the cool region when a cool to warm phase transition is substantially complete, and to move the slider so as to expose the article to the warm region when a warm to cool phase transition is substantially complete.

In a third separate aspect, the present invention may take the form of a method of cooling a first region that is above the transition temperature of a phase change material having a cold phase and a warm phase and that is proximal to a second region into which heat may be exhausted. The method utilizes an article of the phase change material, and starting in the cold phase, placing the article into thermal contact with the first region, thereby causing the phase change material to undergo a phase transition, changing size. When the phase transition is substantially complete, the article is taken out of thermal contact with the first region and is placed into thermal contact with the second region. At this point, force is applied to the article, so as to cause it to transition to the cold phase, thereby exhausting heat into the second region. After this phase transition, the process is begun again, by placing the article, once again, into thermal contact with the first region.

DETAILED DESCRIPTION OF THE PREFERRED EMBODIMENT(S)

Figure 1A:
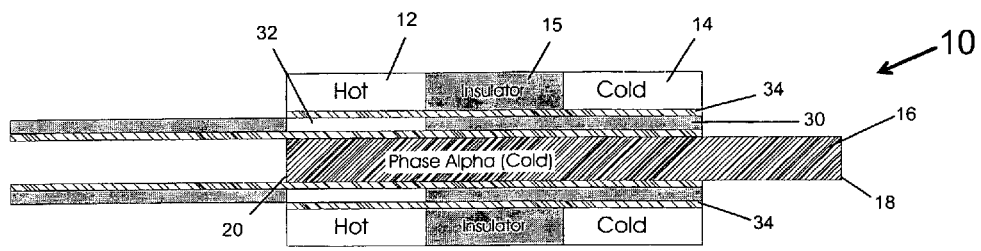
FIGS. 1A-1D is an illustration of a simplified theoretical thermal difference engine in four phases of its operation.
Figure 1B:
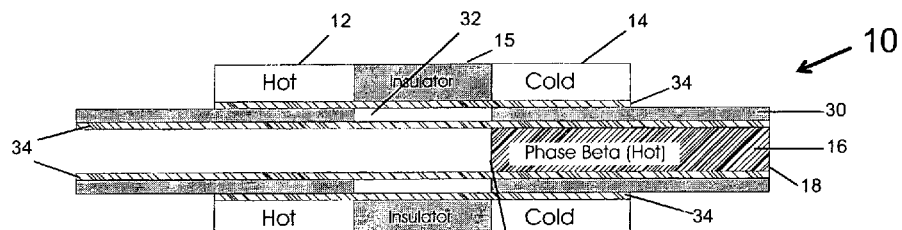

FIGS. 1A-1D, is a simplified system illustration for showing the theory of operation of a preferred embodiment of the present invention. This embodiment incorporates an assembly 10 for creating kinetic energy from a juxtaposed warm region 12 and cold region 14, separated by an insulator 15. A tube of shape memory material 16, such as Nitinol is set into assembly 10 so that a first end 18 is fixed in position and a second end 20 is free to move as a result of phase change expansion and contraction. Nitinol, an alloy of nickel and titanium that is well documented, expands when cooled through the phase change transition point, and contracts when warmed through this transition.

A tube 30 of insulating material partially surrounds article 16 and defines a thermal window 32, which is thermally conductive. Layers of thermally conductive lubricant 34 help tube 30 to be slid back and forth.

In a first stage, shown in FIG. 1A, tube 16 is in its cold and elongated phase. It is being warmed by the warm region 12, to which tube 16 is exposed by window 32 of insulating tube 30. Thermal window 32 is left permitting tube 16 to be warmed until tube 16 phase transitions to its warm, contracted phase. At some point, sufficient thermal energy has been absorbed by tube 16 to effect a phase transformation to the warm, contracted phase.

This transformation does not occur instantaneously, however, as it takes time for the molecules making up the material of tube 16 to rearrange themselves. At this point, tube 16 is removed from thermal contact with the hot region 12, but not placed in thermal contact with the cold region 14, so that tube 16 may transition phase without absorbing any more heat than necessary.

Figure 1C:
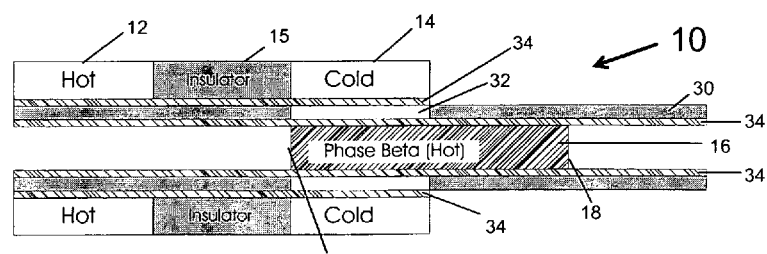
Figure 1D:
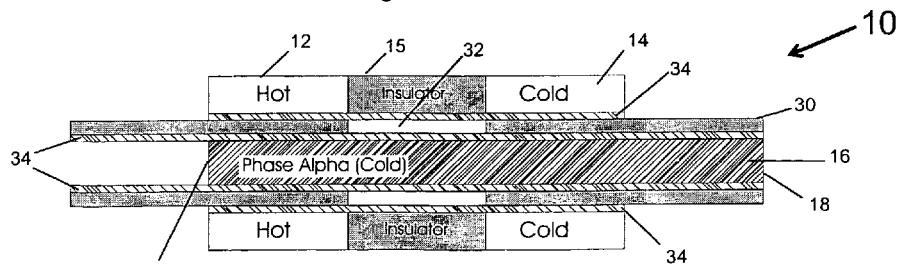
Figure 2A:
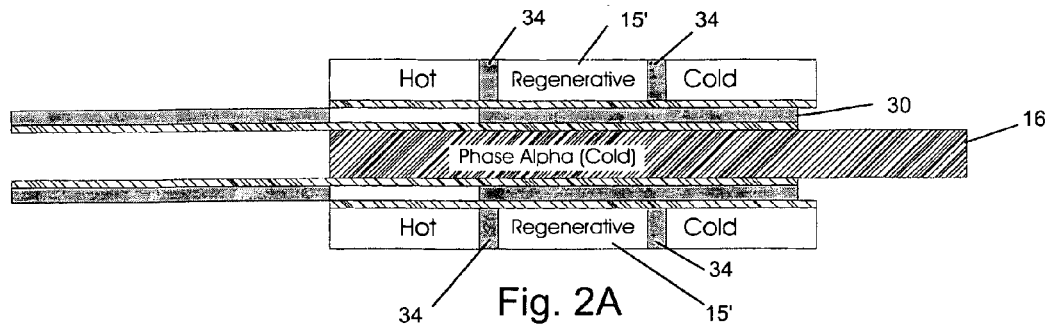
FIGS. 2A-2D is an illustration of an alternative simplified theoretical thermal difference engine in four phases of its operation.
Figure 2B:
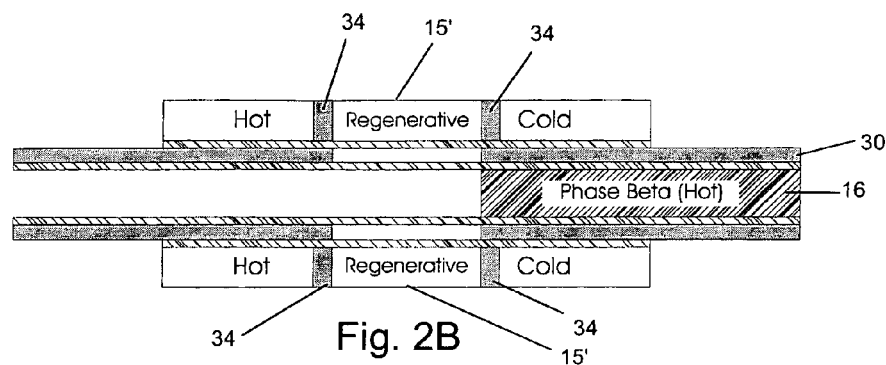
Figure 2C:
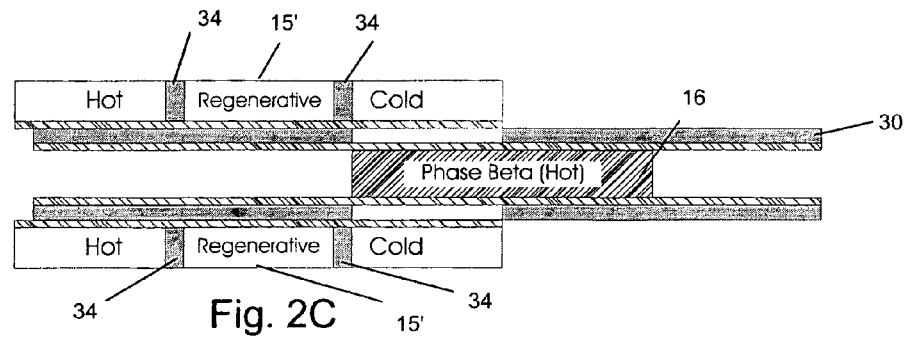
Figure 2D:
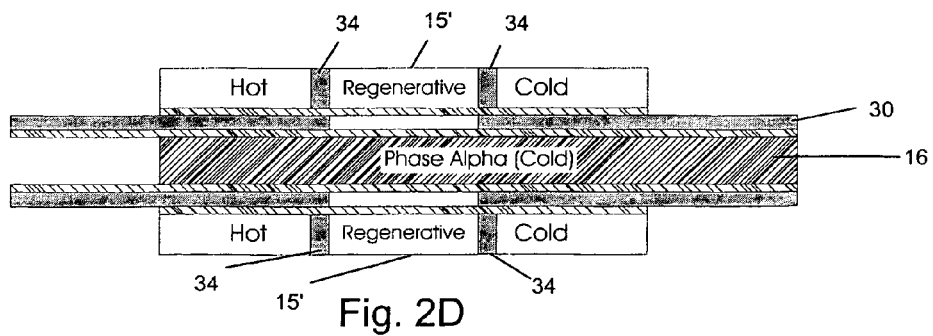

As a consequence, when tube 16 is placed into thermal contact with cold region 14, by moving tube 30 as shown in FIG. 1C, it is no warmer than it must be to be in the warm, contracted phase. Consequently, a minimum amount of cooling is needed to re-transition to the cold, expanded phase. As shown in FIG. 1D, when tube 16 is colder than needed to transition to its cold, expanded phase, it is removed from contact with cold region 14 and permitted to finish contracting, so that when the process restarts (FIG. 1A) it is no colder (or only minimally colder) than needed, to be in the cold, expanded state. This eases and speeds up the task of re-warming. It may be noted that to actually expand, as shown in FIG. 1D, Nitinol must have a tensile force exerted upon it.

FIGS. 2A-2D, show the same cycle, but wherein a thermally absorptive volume 15' replaces the insulator 15. Accordingly, a portion of the heat absorbed in excess of that which is required to cause the transition to the warm, contracted phase is expelled by tube 16 and absorbed by volume 15' in the step of FIG. 2b. This heat remains available in volume 15' to speed the re-warming tube 16 in the step of FIG. 2D. Likewise, the cooling of volume 15', in the step of FIG. 2D, places volume 15' in a cool state that speeds the cooling of tube 16, in the step of FIG. 2B.

Figure 3:
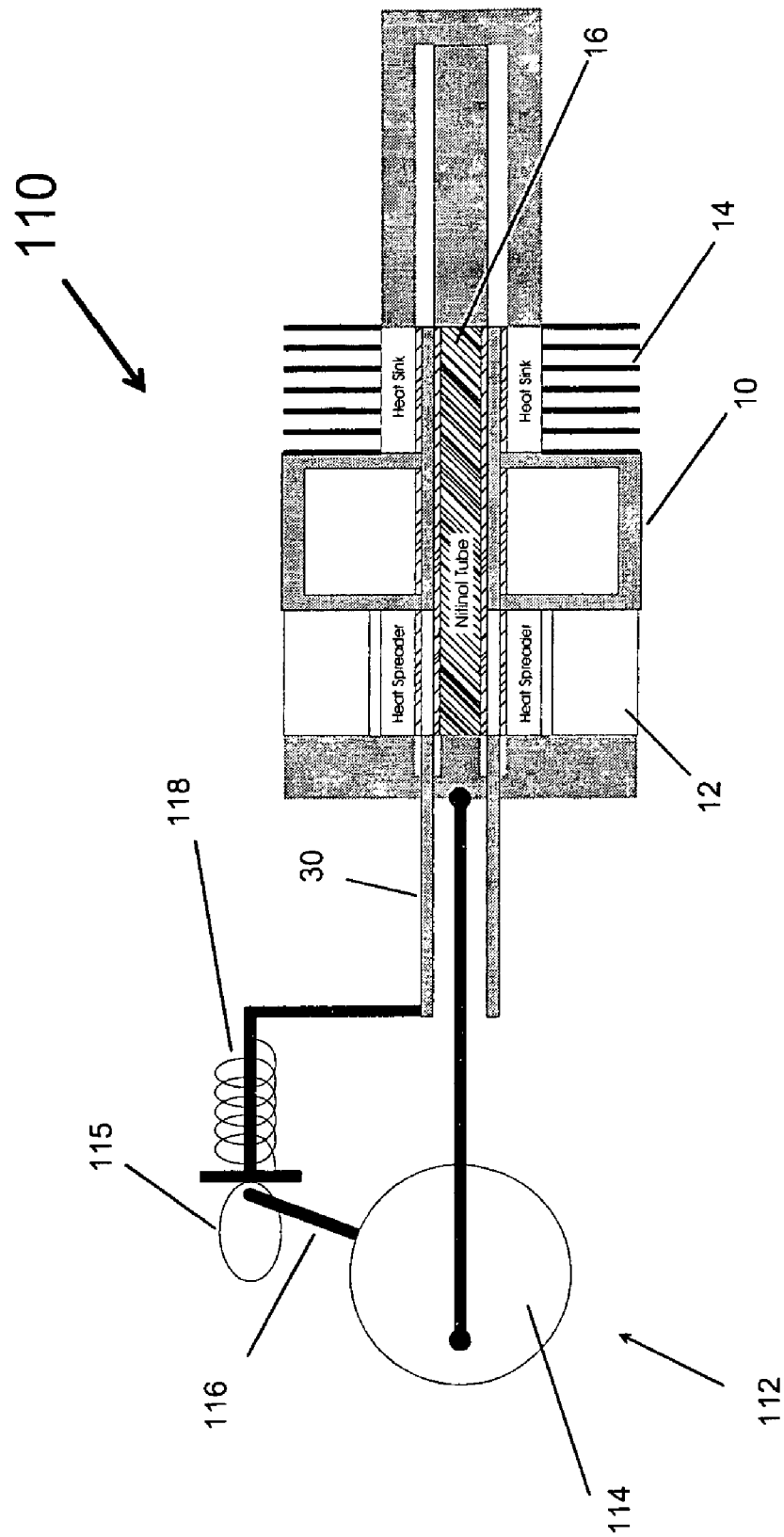
FIG. 3 is an illustration of a thermal difference engine.

Referring to FIG. 3, a complete assembly 110 using subassembly 10 includes a cam assembly 112 that moves tube 30 in response to the movement of tube 16. Flywheel 114 is driven by tube 16, turning cam shaft 116. This causes cam 115 to depress and release cam follower spring 118, which moves tube 30 in a related counter-cycle to the movement of tube 16. The tensile force required to expand nitinol in its cool phase is provided by the inertial energy stored in the flywheel during the transition to the warm, contracted phase.

Figure 4A:
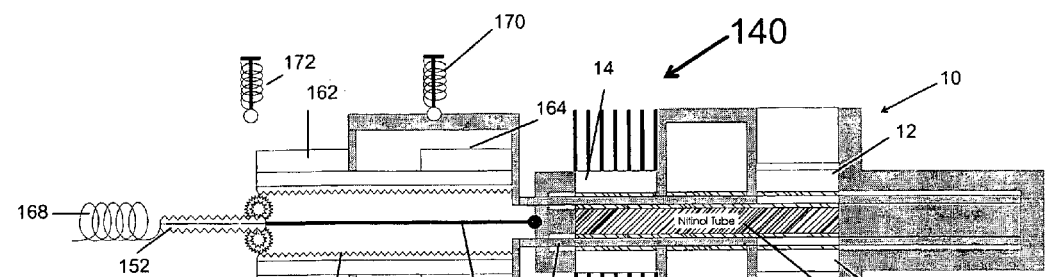
FIGS. 4A-4D is an illustration of a complete thermal difference engine, showing four phases of its operation.
Figure 4B:
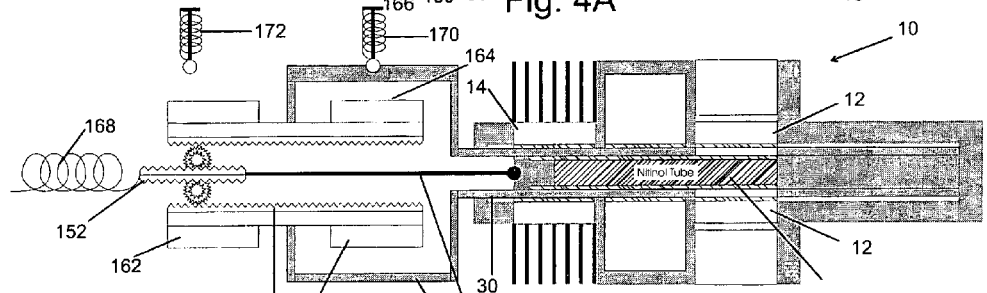
Figure 4C:
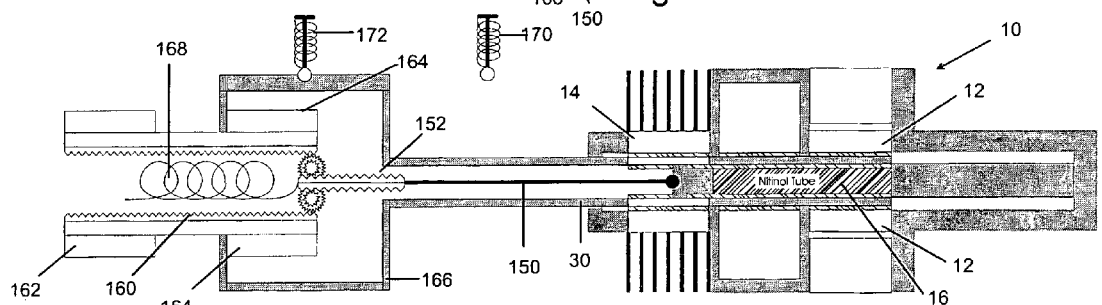
Figure 4D:
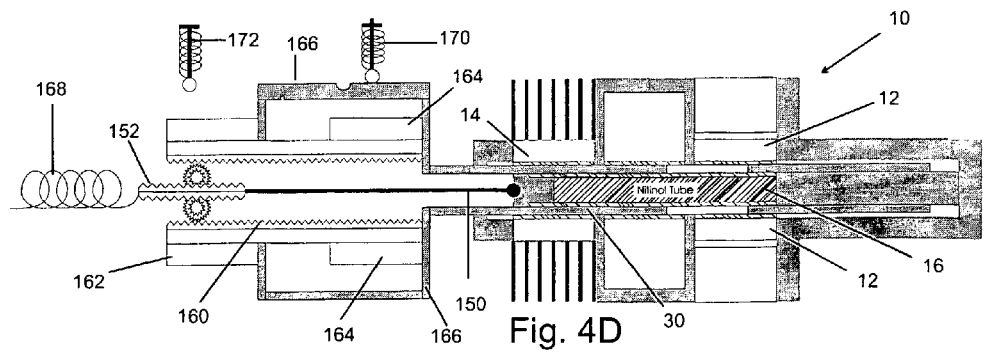

Referring to FIGS. 4A-4D, a system 140 is shown in which the more theoretical system 10 of FIG. 2 appears as a subsystem 10. In this system, when tube 16 shrinks, it pulls on a rod 150 and attached drive rack 152 inward (to the right in the figures). This moves a concentric cam rack 160 outward. On the radially outward section of cam rack 160 is at least one axially outward projection 162 and an axially inward projection 164. Cooperatively engaged with projections 162 and 164 is an actuating arm 166 that is attached to insulating tube 30. Arm 166 is held in place in an axially inward position by an axially inward spring loaded detent roller 170. In an alternative position axially outward position arm 166 is held in place by an axially outward spring loaded detent roller 172. Referring to FIG. 4B, as cam rack 160 is moved axially inward projection 164 approaches the arm 166, attached to insulating tube 30. Referring to FIG. 4C, eventually outward projection 164 contacts arm 166, pushes it so that it is freed from detent roller 170 and continues to push it until it locks into place on detent roller 172. The transition from roller 170 to 172 happens at a speed determined by the gear ratio between cam rack 152 and cam rack 160. The speed of transition is such that thermally absorbtive volume 15' will come into contact sufficiently to absorb some excess heat from tube 16. [Need to insert number 15' in drawing—NT] In FIG. 4D protrusion 162 is approaching arm 166 as the Nitinol tube 16 expands as a result of its transition to the cool state. A spring 168 operatively pulls on tube 16, because, as noted above, Nitinol requires tensile force, as well as a low temperature, in order to expand. Tube 16 has come into thermal contact through the thermal window of tube 30 with thermally absorbtive volume 15' and absorbs some of its previously shed excess heat.

Figure 5:
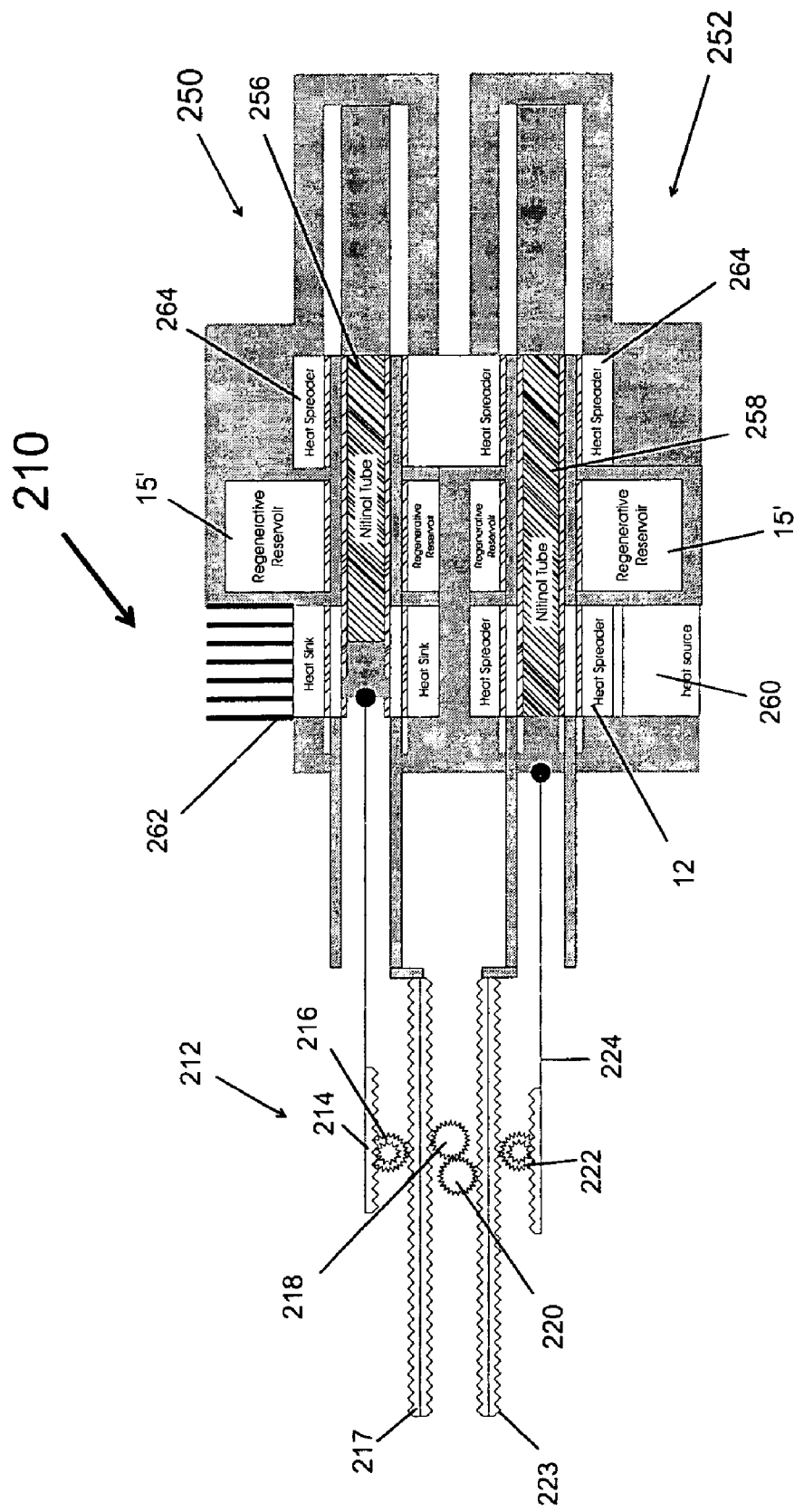
FIG. 5 is an illustration of an alternative embodiment of a thermal difference engine.

Referring to FIG. 5, in a further embodiment a dual assembly 210 includes two subassemblies 250 and 252. Subassembly 250 is always 180° out of phase with subassembly 252, with the rack and pinion assembly 212 harnessing the contraction of subassembly 250 to provide the necessary tensile force to expand subassembly 252, and vice versa. In greater detail, when Nitinol tube 256 contracts it pulls drive rack 214 inwardly (to the right in FIG. 5). This turns concentric pinions 216 clockwise which drives drive rack 217 outwardly. In turn, pinion 218 is driven in a counterclockwise direction, driving pinion 220 clockwise and, in turn, rack 223 inwardly. Finally, concentric pinions 222 are driven clockwise, by rack and rod 224 to pull outwardly on Nitinol tube 258, thereby providing the necessary tensile force to cause tube 258 to expand.

Another feature of dual assembly 210 is the heat sharing and passage between subassembly 258, which is directly heated by heat source 260 and subassembly 256, which contacts heat sink 262. Heat spreader 264 permits heat to travel from tube 258, in its warm, contracted state, to tube 256 in it expanded, cold state. In a preferred embodiment tube 258 is made of a type of Nitinol having a higher phase transition temperature than tube 256.

Figure 6:
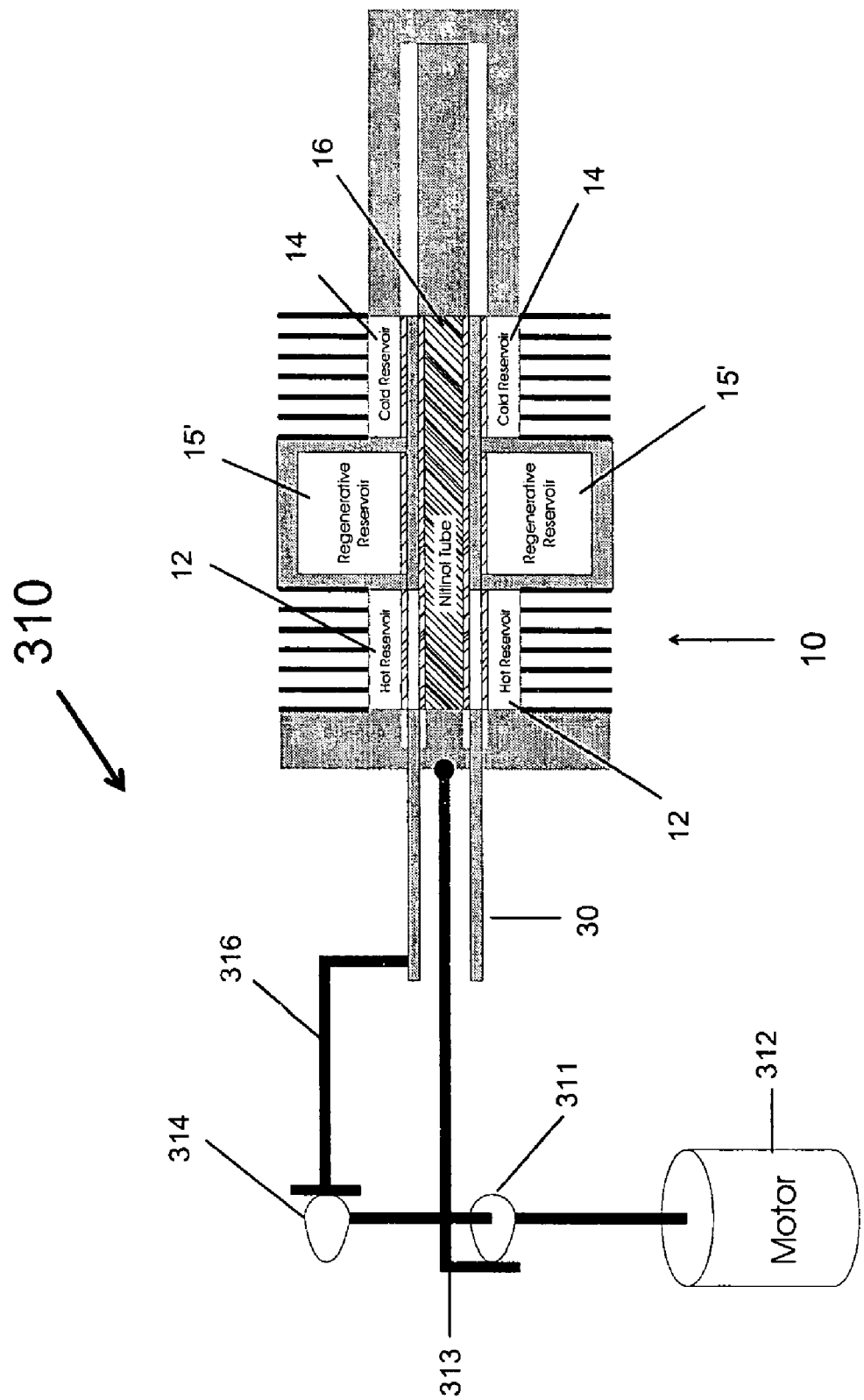
FIG. 6 is an illustration of a preferred embodiment of a heat pump.

Referring to FIG. 6, another preferred embodiment takes the form of a refrigerator 310. A motor 312 is provided to drive assembly 10, by pulling on tube 16 by way of a cam 311 and a cam-following rod 313 to cause it to undergo a stress-induced phase transition into the expanded cold phase. This is done with tube 30 in a position that places tube 16 in thermal contact with region 14, which in this instance does not have to be cool, but must be able to absorb the heat that is expelled from tube 16 as it is pulled by motor 312. After this, tube 30 is moved so as to place tube 16 in thermal contact with heat reservoir 15', expelling more heat in a region that is typically cooler than region 14. When the bulk of the heat has been expelled from tube 16 then tube 30 is moved to place tube 16 into thermal contact with warm prospectively cooled region 12, so that it may absorb heat from this region. To do this, motor 312 is operatively connected to and moves tube 30, through the rotation of cams 314 and cam follower 316. The motor, through cam 311 and cam follower 313 releases stress from tube 16, permitting it to transition to its contracted, warm state, as it absorbs heat from region 12. After tube 16 has absorbed enough heat to transition to its warm, reduced phase, tube 30 is moved to place tube 16 into contact with the thermally absorptive volume 15', where it continues to absorb heat, cooling volume 15'. As tube 16 transitions, it is placed in thermal contact with region 14 through the motion of tube 30 and is again stressed by motor 312 causing it to transition to its cold phase and expelling heat into region 14, beginning the cycle again. Volumes 15' provides a place to position tube 16 when it has warmed up to a higher temperature than that in the cooled or prospectively cooled region 12, so that tube 16 may further warm without warming region 12, and before being placed in region 14.

The terms and expressions that have been employed in the foregoing specification are used as terms of description and not of limitation. There is no intention, in the use of such terms and expressions, of excluding equivalents of the features shown and described or portions thereof, it being recognized that the scope of the invention is defined and limited only by the claims which follow.

The invention claimed is:

1. An engine for generating motion from a cool region that is proximal to but separated from a warm region said cool region and said warm region defining a temperature range, said engine comprising:
   (a) an article of phase change material having a phase transition within said temperature range and an assembly of elements;
   (b) a shuttle of thermal insulating material, adapted to be placed in a first position adapted to expose said article of phase change material to said cool region while insulating said article from said warm region, and alternately placed in a second position adapted to expose said article to said warm region, while insulating said article from said cool region, said shuttle having a third position between said first position and said second position, wherein said article is insulated from both said cool region and said warm region;
   (c) a shuttle movement assembly, adapted to move said shuttle to said third position when a cool to warm phase transition is well underway and to said first position to expose said article to said cool region after a cool to warm phase transition is substantially complete, and to move said shuttle to said third position when a warm to cool phase transition is well underway and to said second position so as to expose said article to said warm region after a warm to cool phase transition is substantially complete.

2. The engine of claim 1 wherein said article is a tube.

3. The engine of claim 1 wherein said phase change material is Nitinol.

4. The engine of claim 1 wherein said shuttle is in the form of a tube, in which said article of phase change material is nested.

5. The engine of claim 1 wherein said shuttle is moved by a cam assembly.

6. The method of claim 5, wherein said cam assembly is driven by said article of phase change material.

* * * * *